United States Patent
Mishra et al.

(10) Patent No.: US 10,231,306 B2
(45) Date of Patent: Mar. 12, 2019

(54) LIGHTING CONTROLLER, A LIGHTING SYSTEM AND A METHOD FOR CONTROLLING LIGHTING

(71) Applicant: PHILIPS LIGHTING HOLDING B.V., Eindhoven (NL)

(72) Inventors: Priya Ranjan Mishra, Bangalore (IN); Rakeshbabu Panguloori, Bangalore (IN)

(73) Assignee: PHILIPS LIGHTING HOLDING B.V., Eindhoven (NL)

(*) Notice: Subject to any disclaimer, the term of this patent is extended or adjusted under 35 U.S.C. 154(b) by 105 days.

(21) Appl. No.: 15/519,213

(22) PCT Filed: Oct. 10, 2015

(86) PCT No.: PCT/EP2015/073493
§ 371 (c)(1),
(2) Date: Apr. 14, 2017

(87) PCT Pub. No.: WO2016/058962
PCT Pub. Date: Apr. 21, 2016

(65) Prior Publication Data
US 2017/0245337 A1  Aug. 24, 2017

(30) Foreign Application Priority Data

Oct. 14, 2014 (IN) .............. 5151/CHE/2014
Mar. 27, 2015 (EP) .................... 15161282

(51) Int. Cl.
*H05B 33/08* (2006.01)
*H05B 37/02* (2006.01)

(52) U.S. Cl.
CPC ..... *H05B 33/0851* (2013.01); *H05B 33/0812* (2013.01); *H05B 33/0854* (2013.01); *H05B 37/0281* (2013.01)

(58) Field of Classification Search
CPC ............ H05B 33/0851; H05B 33/0812; H05B 33/0854; H05B 37/0281
See application file for complete search history.

(56) References Cited

U.S. PATENT DOCUMENTS 4,160,917 A * 7/1979 Wald ..................... H02J 3/46
                                                                  307/64
5,140,229 A    8/1992 Yagi et al.
(Continued)

FOREIGN PATENT DOCUMENTS

EP    1465395 A2    6/2004
JP    2014050112 A   3/2014

OTHER PUBLICATIONS

Katsis, Dimosthenis, et al., "A Single Switch Buck Converter for Hybrid Electric Vehicle Generators," IEEE 1996 (7 Pages).

*Primary Examiner* — Seokjin Kim

(57) ABSTRACT

The invention provides a lighting controller, comprising: a detector adapted to detect a voltage of a power source, said power source is for providing power to a lighting unit via a lighting driver; a controlling unit, coupled to the lighting driver and adapted for controlling the driver to deliver a constant power to the lighting unit regardless of the power source is being consumed, before the detected voltage drops below a first threshold, and controlling the driver to deliver a gradually reduced power to the lighting unit after the detected voltage drops below the first threshold. Wherein the controlling unit is further adapted for switching an up-converter between the power source and the driver to boost the output voltage from the power source to the driver, in a first condition; and bypassing said up-converter, in a second condition, and implementing said step of controlling the driver; wherein said first condition comprises operating in high occupancy periods, and said second condition comprises operating in low occupancy periods

8 Claims, 3 Drawing Sheets

(56) References Cited

U.S. PATENT DOCUMENTS

| | | |
|---|---|---|
| 5,821,699 A | 10/1998 | Moisin |
| 5,867,377 A | 2/1999 | Suranyi |
| 2002/0109467 A1 | 8/2002 | Ito et al. |
| 2003/0062855 A1 | 4/2003 | Ishihara et al. |
| 2006/0125423 A1 | 6/2006 | Chitta et al. |
| 2009/0267541 A1* | 10/2009 | Hsu .................. H05B 33/0842 315/307 |
| 2011/0115776 A1 | 5/2011 | Yun et al. |
| 2011/0254462 A1 | 10/2011 | Ruan et al. |
| 2012/0163034 A1 | 6/2012 | Kim et al. |
| 2013/0249520 A1* | 9/2013 | Oikarinen ............ H02M 3/158 323/285 |
| 2013/0257405 A1 | 10/2013 | Kangas |
| 2014/0111091 A1* | 4/2014 | Grajcar ............. H05B 33/0809 315/122 |
| 2014/0139114 A1 | 5/2014 | Garcia |

* cited by examiner

LIGHTING CONTROLLER, A LIGHTING SYSTEM AND A METHOD FOR CONTROLLING LIGHTING

CROSS-REFERENCE TO PRIOR APPLICATIONS

This application is the U.S. National Phase application under 35 U.S.C. § 371 of International Application No. PCT/EP2015/073493, filed on Oct. 10, 2015, which claims the benefit of Indian Patent Application No. 5151/CHE/2014, filed on Oct. 14, 2014 and European Patent Application No. 15161282.7, filed on Mar. 27, 2015. These applications are hereby incorporated by reference herein.

FIELD OF THE INVENTION

This invention relates to a lighting controller, and particularly relates to a lighting controller which dims the light according to state of the energy source.

BACKGROUND OF THE INVENTION

To reduce the energy consumption per day in outdoor lighting system, light output is reduced or dimmed during non-occupancy or low utilization period such as in the middle of night. There are various methods in prior art to achieve dimming e.g. presence based dimming, time based dimming etc. These dimming methods are employed on individual lighting units or at group level. Most common dimming profile employed are time based dimming e.g. full brightness between dusk to 11 PM and 20-30% dimming from 11 PM to dawn. Dimming control is built in each lighting system in decentralized solar system. In prior art; in centralized system individual lighting units are communicated through wire or wireless i.e. PLC or zig bee or RF communication, but these are complex & costly. Additionally in some applications "time based dimming profile" is built in individual lamps. In these applications, it is very difficult to alter the dimming profile. Further, they need RTOS (real-time operating system) based system otherwise timer will vary from one lamp unit to another.

We also know that the overall system efficiency decreases significantly at lower dimming levels in AC grid due to decrease in efficiency of the inverter. Therefore, DC grid is becoming more popular. Though DC grid is better than AC grid, they also suffer efficiency loss when operated at lower dimming level due to decrease in efficiency of LED drivers. These result in higher PV and battery capacity and in turn results in higher system cost. Therefore, there is need of low cost efficient dimmable outdoor lighting system.

In the prior art, the lamps are usually operating at a constant power to deliver a constant lumen output despite the power source/battery state. If the battery is completely consumed, a black out occurs and the lighting system can not emit any light, which is very dangerous and inconvenient for the users. Thus it would be advantageous to have a more sophisticated lighting control mechanism that avoids black out.

U.S. Pat. No. 5,140,229A1 discloses that constant power control with the rated power is effected when the supply voltage is high and power lower than the rated power is supplied to the metal halide lamp in accordance with the reduction in power supply voltage.

EP1465395A2 discloses there is an up-converter that can be bypassed or switched on according to the output of the voltage source.

SUMMARY OF THE INVENTION

It would be advantageous to switch the up-converter in a more flexible way according to the real environment. To address at least the above concern, the invention is defined by the claims.

According to a first aspect of the invention, it is provided a lighting controller, comprising: a detector adapted to detect a voltage of a power source, said power source is for providing power to a lighting unit via a lighting driver; and a controlling unit, coupled to the lighting driver and adapted for controlling the driver to deliver a constant power to the lighting unit regardless of the power source is being consumed, before the detected voltage drops below a first threshold, and controlling the driver to deliver a gradually reduced power to the lighting unit after the detected voltage drops below the first threshold; the controlling unit is further adapted for switching an up-converter between the power source and the driver to boost the output voltage from the power source to the driver, in a first condition; and bypassing said up-converter, in a second condition, and implementing said step of controlling the driver. Said first condition comprises operating in high occupancy periods, and said second condition comprises operating low occupancy periods.

In this aspect, when the power source still has sufficient energy, a constant power is drawn and delivered by the driver to the lighting unit, thus a constant lumen output can be provided; when the available energy in the power source drops below a threshold, in order to avoid a complete consumption of the power source and black out of the lighting unit, a gradually reduced power is drawn by the driver, and achieves a prolonged brown out lighting service which can at least partially satisfy the users. This aspect is a sophisticated combination of constant power load and non-constant power load. This aspect provides another lighting mode to provide more output lumen for the lighting unit wherein the voltage from the power source is boosted/up-converted before to the driver. And when no need for high output, the up-converter is bypassed to reduce the voltage to the driver, and also to save the switching loss of the up-converter. High occupancy periods require more light thus the up-converter is in the power loop; low occupancy periods do not need much light thus the up-converter is bypassed.

In a further embodiment, the driver is a switched mode power source. And said controlling unit is adapted for: maintaining or increasing a duty cycle of the driver so as to control the driver to deliver a constant power; and maintaining or decreasing the duty cycle of the driver so as to control the driver to deliver a gradually reduced power.

In this embodiment, when available energy in the power source is still sufficient, as the power source is being consumed, its output voltage will be maintained or gradually decreased, and the driver can maintain or increase its duty cycle to deliver the constant power. When the available energy in the power source is not sufficient, as the power source is being consumed, its output voltage will be gradually decreased, meanwhile the duty cycle is maintained or even decreased, thus power will be drawn from the power source in a gradually decreased way. Alternatively, the driver can also be linear driver and the controlling unit may control the conductivity of the linear power switch in order to control the power delivered by the driver.

In a still further embodiment, the controlling unit is further adapted for fine tuning the duty cycle of the driver such that the driver delivers the gradually reduced and unfluctuated power to the lighting unit, after the detected voltage drops below a second threshold less than said first threshold.

When the power source such as battery is further consumed, its output voltage sometimes fluctuates, in this case if the duty cycle is still maintained, fluctuated power is delivered to the lighting unit thus flicker will occur. To address this concern, when the energy level in the power source is very low, this embodiment allows fine tuning the duty cycle of the driver such that the driver delivers the unfluctuated power. This can avoid flicker which is not comfortable for the user thus the user's experience would be better.

In a more specific embodiment, said high occupancy period comprises evening till or before mid-night, and low occupancy periods comprises mid-night till dawn.

This embodiment provides the application context of the invention.

In a further embodiment, the controlling unit is further adapted to control the duty cycle of the up-converter, the up-converter comprises an isolated boost converter, and the controlling unit further comprises a diode forwarded between the input and the output of the up-converter.

In this embodiment, the boost converter can be bypassed by the diode automatically if the output voltage is no higher than the input voltage from the power source, thus the circuit structure is very simple.

In alternative embodiment, the controller is further adapted to control the duty cycle of the up-converter, the up-converter comprises a non-isolated boost converter wherein the controlling unit further comprises a boost diode forwarded from the connection point of an inductor and a switch of the boost converter to an output capacitor of the boost converter.

In this embodiment, the boost converter can be bypassed if the switch of the boost converter is kept open, thus the circuit structure is very simple.

In a second aspect of the invention, a system comprising the above controller is provided: a lighting system, comprising: a power source; an up converter coupled with the power source; a driver coupled to the up converter; a lighting unit coupled to the driver; and a lighting controller according to the first aspect, coupled to power source and the driver.

In a third aspect of the invention, it is provided a method for controlling lighting, comprising the steps of: detecting a voltage of a power source, said power source is for providing power to a lighting unit via a lighting driver; controlling the driver to deliver a constant power to the lighting unit regardless of the power source is being consumed before the detected voltage drops below a first threshold, controlling the driver to deliver a gradually reduced power to the lighting unit after the detected voltage drops below the first threshold; switching an up-converter between the power source and the driver to boost the output voltage from the power source, in a first condition; and bypassing said up-converter, in a second condition, and implementing said step of controlling; wherein said first condition comprises operating in high occupancy periods, and said second condition comprises operating in low occupancy periods.

These and other aspects of the invention will be apparent from and elucidated with reference to the embodiment(s) described hereinafter

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a lighting controller, comprising:
a detector adapted to detect a voltage of a power source, said power source is for providing power to a lighting unit via a lighting driver;
a controlling unit, coupled to the lighting driver and adapted for
   controlling the driver to deliver a constant power to the lighting unit regardless of the power source is being consumed, before the detected voltage drops below a first threshold, and
   controlling the driver to deliver a gradually reduced power to the lighting unit after the detected voltage drops below a first threshold.
Preferably, the controlling unit is further adapted for
switching an up-converter between the power source and the driver to boost the output voltage from the power source to the driver, in a first condition; and
bypassing said up-converter, in a second condition, and implementing said step of controlling the driver.

Hereinafter, several modes are used for describing in which way the lighting controller is controlling the driver and the up-converter.

Figure 1:
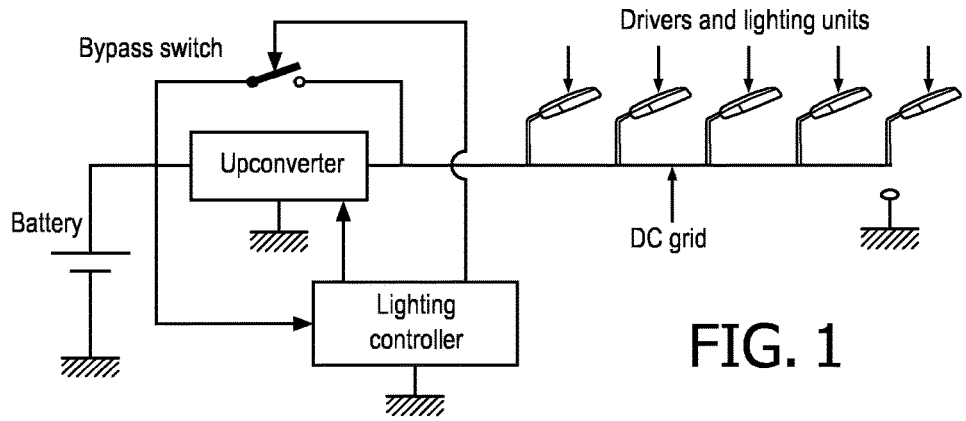
FIG. 1 shows a schematic block diagram of a lighting system according an embodiment of the invention.

The lighting system according to embodiments of the invention comprises the above lighting controller, and a power source, an up-converter, a bypass switch, and one or more drivers with lighting units such as LED lamps. As shown in FIG. 1, the power source is preferably a battery or battery set such as that charged by photovoltaic cells during day time and discharges to power road lamps in evening/night time.

Preferably, the first condition and the second condition are determined by the occupancy state of the space that is to be illuminated. For example when people are more, more light is generally expected; otherwise when few or no people is there, less light is just enough. This occupancy state can be detected by occupancy sensors. Alternatively, for outdoor application such as road lighting, campus lighting or park lighting, the evening/night time can indirectly reflect the occupancy state: in evening till mid-night there is more occupancy and from mid-night till dawn, less or no people is there; and just before dawn more people may come out. Also, in day time there is no need to turn on the light.

Figure 2:
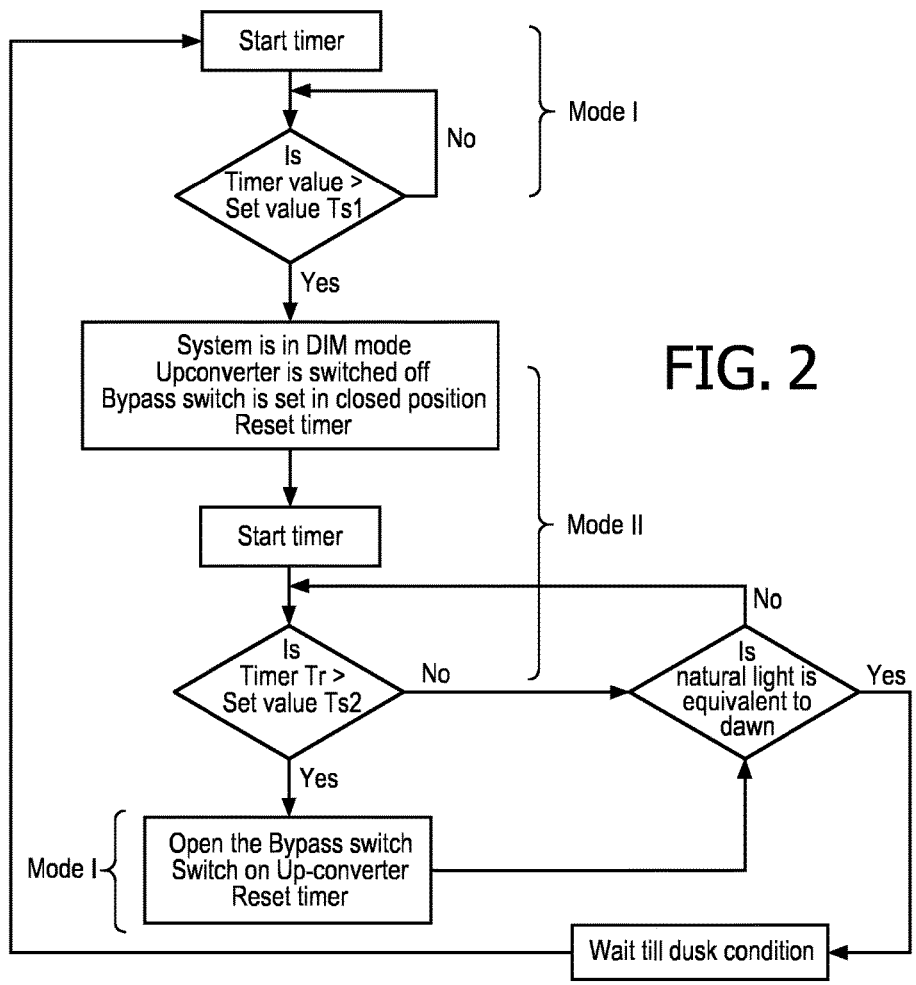
FIG. 2 shows a timing flowchart for the lighting system to switch its light output according to the day/evening/night time.

Thus, the lighting controller can use an RTOS (Real-time operating system) based timer or simple hour-minute timer. The timing flowchart can be shown in FIG. 2. The timer starts at dusk, at this time the up-converter is turned on in the loop, and the driver and lamp operate, thus a high light output is provided. This way of controlling can be called as mode I. After a predefined time from dusk, the time reaches a set value Ts1 which indicates the mid-night. Then system is switched to mode II wherein the up-converter is bypassed. The timer may be rest. After another predefined time from mid-night, the time reaches a set value Ts2 which indicates just before the dawn. Then the up-converter is in the power loop again and the lighting unit may again output full brightness, and the system works in mode I again. When the natural light is equivalent to dawn, namely it is dawn, the lighting system can stop from providing light and wait until dusk again.

Figure 3:
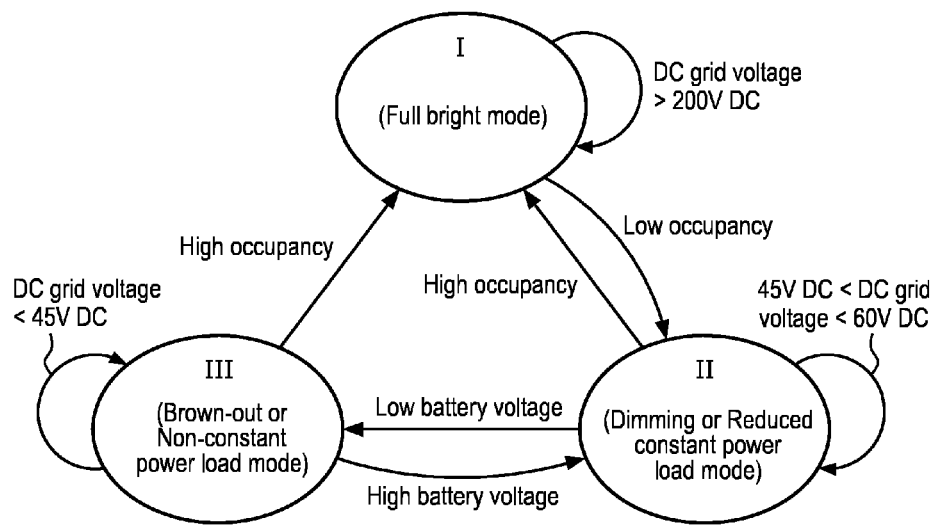
FIG. 3 shows a state transition diagram for the lighting system to dim its light output according to voltage of the power source.

FIG. 3 also shows the transition between mode I and mode II depending on high occupancy or low occupancy. In the mode I, the up-converter can boost the battery voltage and provide a 220V DC voltage on the DC grid to the driver; in the mode II, the up-converter is bypassed, and the voltage from the power source that is 60V is provided on the DC grid. The lighting unit is dimmed down after sensing the lower input voltage to the driver, preferably with change in frequency. Assume the driver has an efficiency of 85% at non-dimmed state, the overall efficiency is 80% (0.85*0.95) without bypassing the up-converter and no-dimming the driver. It has experimental fact and the inventors verified in lab that the efficiency of LED driver decreases by at least 5% at 30% dimming level. In case of maintaining the up-converter and dimming the driver, additional loss of efficiency to the tune of 5-7% at reduced dimming level, and overall system efficiency decreases to 72% (0.8*0.9).

Further, FIG. 3 shows how the lighting controller switches between mode II and mode III depending on the energy level or output voltage in the power source/battery. In mode II, that is mid-night time till dawn, the output voltage from the battery is originally 60V. The duty cycle of the driver is set to a certain value to obtain a desired output lumen that is less than the full brightness output in mode I.

After a certain time's consumption, the energy in the battery is partially consumed, and this usually leads to the decrease of the output voltage of the battery. Set a threshold of 45V for this output voltage, and before the output voltage of the battery drops below this threshold, the lighting controller will control the driver to deliver a constant power to the lighting unit regardless of how the power source is being consumed. More specifically, as the voltage decrease from 60V to 45V, the duty cycle of the driver is increased such that constant power is delivered. Additionally, during this decrease from 60V to 45V, the voltage may not continuously decrease but may be stable at some voltage for a while, and in this while the duty cycle of the driver is also maintained such that constant power is delivered. In turn, in mode II, the normal lighting requirement is met via a constant lumen output. More specifically, the driver can have a voltage detection circuit to detect the voltage, and increases its duty cycle proportional to the decrease in battery voltage. Alternatively, the controller can determine a duty cycle proportional to the decrease in battery voltage and notify the drivers about this determined duty cycle.

Additionally, as the voltage of the battery further drops, there is a risk that the energy in the battery is completely consumed before the desired ending time, such as dawn. Such problem may occur in case that the solar cell does not store enough energy into the battery if the day time is cloudy. If the energy in the battery is completely consumed, no light output can be obtained and a black out occurs. To avoid this, after the voltage of the battery drops below 45V, the lighting controller enters mode III wherein it controls the driver to deliver a gradually reduced power to the lighting unit. More specifically, the controller can maintain or decrease the duty cycle of the driver to maintain or decrease the rate that power is drawn from the battery. Therefore the power delivered to the lighting unit is gradually reduced as the voltage of the battery decreases and the rate is maintained or decreased. Alternatively, in case the driver is a linear driver, the lighting controller can maintain or increases the conductivity of the linear power switch. More specifically, the controller can notify the driver to maintain its duty cycle. Alternatively, the controller can notify the drivers about one constant duty cycle. The lighting system can even switched back to mode II if the output voltage recovers to 45V because additional backup battery is switched in.

Further, as the voltage of the battery still drops for example below 42V, the battery voltage may fluctuate, namely decrease and increase in a fast manner that results flicker of the lighting unit perceptible by human. To avoid this, the controller may fine tune the duty cycle of the driver such that the driver delivers the gradually reduced and unfluctuated power to the lighting unit. More specifically, the controller may itself or control the driver record the power delivered in a previous instant, for example 10 ms ago, and try to regulate the power, delivered at a subsequent instant, as the same or similar as the recorded one despite whether the battery voltage changes or not. If the battery voltage does not fluctuate, the duty cycle of the driver at the subsequent instant is maintained; if the battery voltage fluctuates, the duty cycle of the driver at the subsequent instant can be tuned in reverse direction. It should be understood that the fine tuning to eliminate fluctuation is in the micro/short term perspective, and in the macro/long term perspective the power is still gradually decrease. To this end, the average duty cycle is maintained or decrease in a slow manner, and the extent of fine tuning may be within a certain percentage of the average duty cycle, such as positive and minus 10% to 20%.

Further, just before the dawn, the lighting controller can enter mode I again by switching the up-converter back to the loop. The up-converter can boost the output voltage of the battery to 200V and deliver it via the DC grid to the driver and lighting unit. The lighting controller may also notify the driver to work in its normal full bright state, for example to use its normal duty cycle.

Following will describe some embodiment of the driver and the up-converter.

Figure 4:
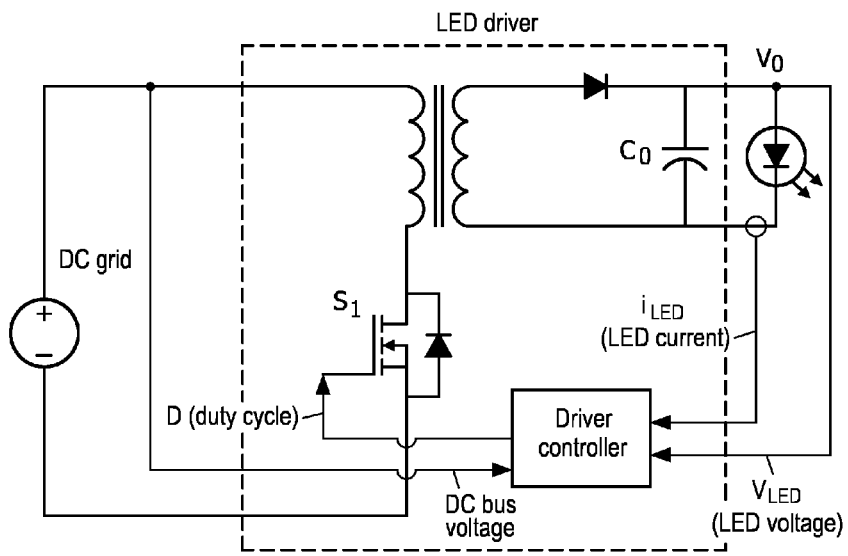
FIG. 4 shows an exemplified LED driver in the lighting system according an embodiment of the invention.

FIG. 4 shows a typical driver for LED as the lighting unit. It is a flyback converter. There is a driver controller, for example a dedicated control IC for flyback converter which controls the duty cycle D of the power switch S1 according to the input voltage on DC grid as well as the LED current and LED voltage. In mode II, the duty cycle D can be controlled to increase as the input voltage on DC grid decreases. In mode III, the duty cycle D can be maintained or decrease. In mode III, the average of the duty cycle D can be maintained and the duty cycle D can be fine tuned within a certain percentage. The principle of flyback converter is well known and the specification would not give more detailed elucidation. Alternatively, other kinds of LED driver are also applicable, such as buck converter or boost converter.

Figure 5:
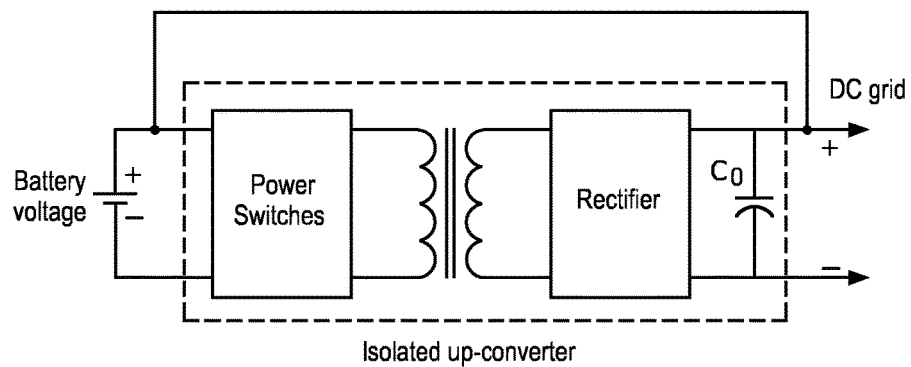
FIG. 5 shows an exemplified up-converter in the lighting system according an embodiment of the invention.

FIG. 5 shows an embodiment of the up-converter with a bypass diode that can bypass the up-converter. This up-converter may be in a flyback form. The power switch at the primary side is controlled to deliver a boosted voltage at the secondary side, in mode I. And in mode II, the power switch can be disabled and the bypass diode may deliver the battery voltage directly to the DC grid.

Figure 6:
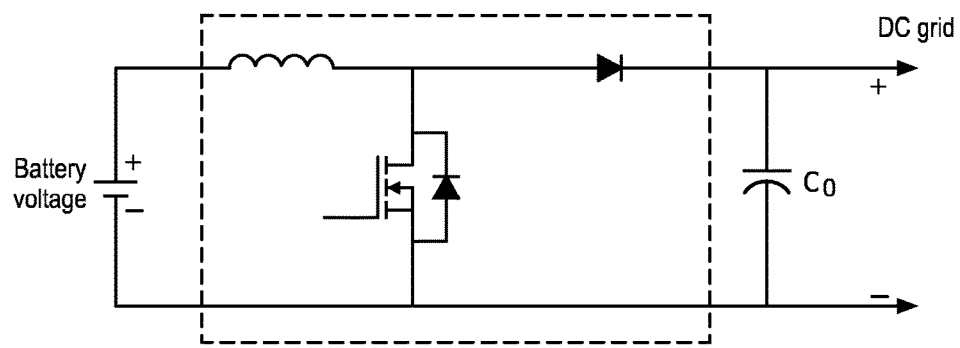
FIG. 6 shows an alternative exemplified up-converter in the lighting system according an embodiment of the invention.

FIG. 6 shows an alternative embodiment of the up-converter, which is a boost converter. In mode I, the power switch can be controlled to close and open to boost the battery voltage to the output capacitor Co. In mode II, the power switch can be kept open and the battery voltage is fed directly to the output capacitor Co and to the DC grid.

Embodiments of the invention can be used in solar based outdoor lighting e.g. street lighting, campus lighting. This proposed system will find good application in Outdoor Lighting System as it will be at least 8-10% more efficient than conventional static DC grid Outdoor Lighting System and 15% more efficient than AC grid Outdoor Lighting System.

The invention has been described in connection with an LED lighting arrangement. However, it can be applied to a driver for other types of lighting technology. For example, other solid state lighting technologies may be used. It should also be understood that the above specific voltage values are just for example, and for different battery system or battery chemistry these values will change.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A lighting controller, comprising:
   a detector adapted to detect an output voltage of a power source, said power source being configured to provide power to a lighting unit via a lighting driver;
   a controlling unit, coupled to the lighting driver and configured to:
      switch an up-converter between the power source and the lighting driver to boost an output voltage from the power source to the lighting driver, in a first condition;
      bypass said up-converter in a second condition; control the lighting driver to deliver a constant power to the lighting unit regardless of power consumption of the power source by the lighting driver, before the detected output voltage decreases to less than a first threshold; and control the lighting driver to deliver a gradually reduced power to the lighting unit after the detected output voltage decreases to less than the first threshold;
   wherein said first condition comprises operation of the lighting device during a first threshold; and
   wherein said second condition comprises operation of the lighting device during a remaining part of the night other than the initial part, and wherein the initial part of the night comprises evening till or before mid-night, and the remaining part of the night comprises mid-night till dawn.

2. The lighting controller according to claim 1, wherein said controlling unit is adapted to:
   maintain or increase a duty cycle of the lighting driver so as to control the lighting driver to deliver a constant power; and
   maintain or decrease the duty cycle of the lighting driver so as to control the lighting driver to deliver a gradually reduced power.

3. The lighting controller according to claim 2, wherein the controlling unit is further adapted to:
   fine tune the duty cycle of the lighting driver such that the lighting driver delivers the gradually reduced power without fluctuation to the lighting unit, after the detected output voltage decreases to less than a second threshold less than said first threshold.

4. The lighting controller according to claim 1, wherein the controlling unit is further adapted to control a duty cycle of the up-converter, the up-converter comprises an isolated boost converter, the controlling unit further comprises a diode forwarded between an input and an output of the up-converter.

5. The lighting controller according to claim 1, wherein the controlling unit is further adapted to control a duty cycle of the up-converter, the up-converter comprises a non-isolated boost converter wherein the controlling unit further comprises a boost diode forwarded from a connection point of an inductor and a switch of the boost converter to an output capacitor of the boost converter.

6. A method for controlling lighting, the method comprising:
   switching an up-converter between a power source and a lighting driver to boost an output voltage from the power source, in a first condition, said power source providing power to a lighting unit via the lighting driver;
   bypassing said up-converter in a second condition;
   detecting the output voltage of a power source;
   controlling the lighting driver to deliver a constant power to the lighting unit regardless of power consumption of the power source by the lighting driver before the detected output voltage decreases to less than a first threshold; and
   controlling the lighting driver to deliver a gradually reduced power to the lighting unit after the detected output voltage decreases to less than the first threshold,
   wherein said first condition comprises operation of the lighting device during an initial part of a night, and
   wherein said second condition comprises operation of the lighting device during a remaining part of the night other than the initial part, and wherein the initial part of the night comprises evening till or before mid-night, and the remaining part of the night comprises mid-night till dawn.

7. The method according to claim 6, wherein controlling the lighting driver to deliver the constant power comprises maintaining or increasing a duty cycle of the lighting driver; and
   controlling the lighting driver to deliver a gradually reduced power comprises maintaining or decreasing the duty cycle of the lighting driver.

8. The method according to claim 7, further comprising:
   fine tuning the duty cycle and frequency of the lighting driver such that the lighting driver delivers the gradually reduced power without fluctuation to the lighting unit, after the detected output voltage decreases to less than a second threshold less than said first threshold.

* * * * *